Feb. 14, 1961 G. A. LYON, JR 2,971,798
WHEEL COVER
Filed Aug. 31, 1956
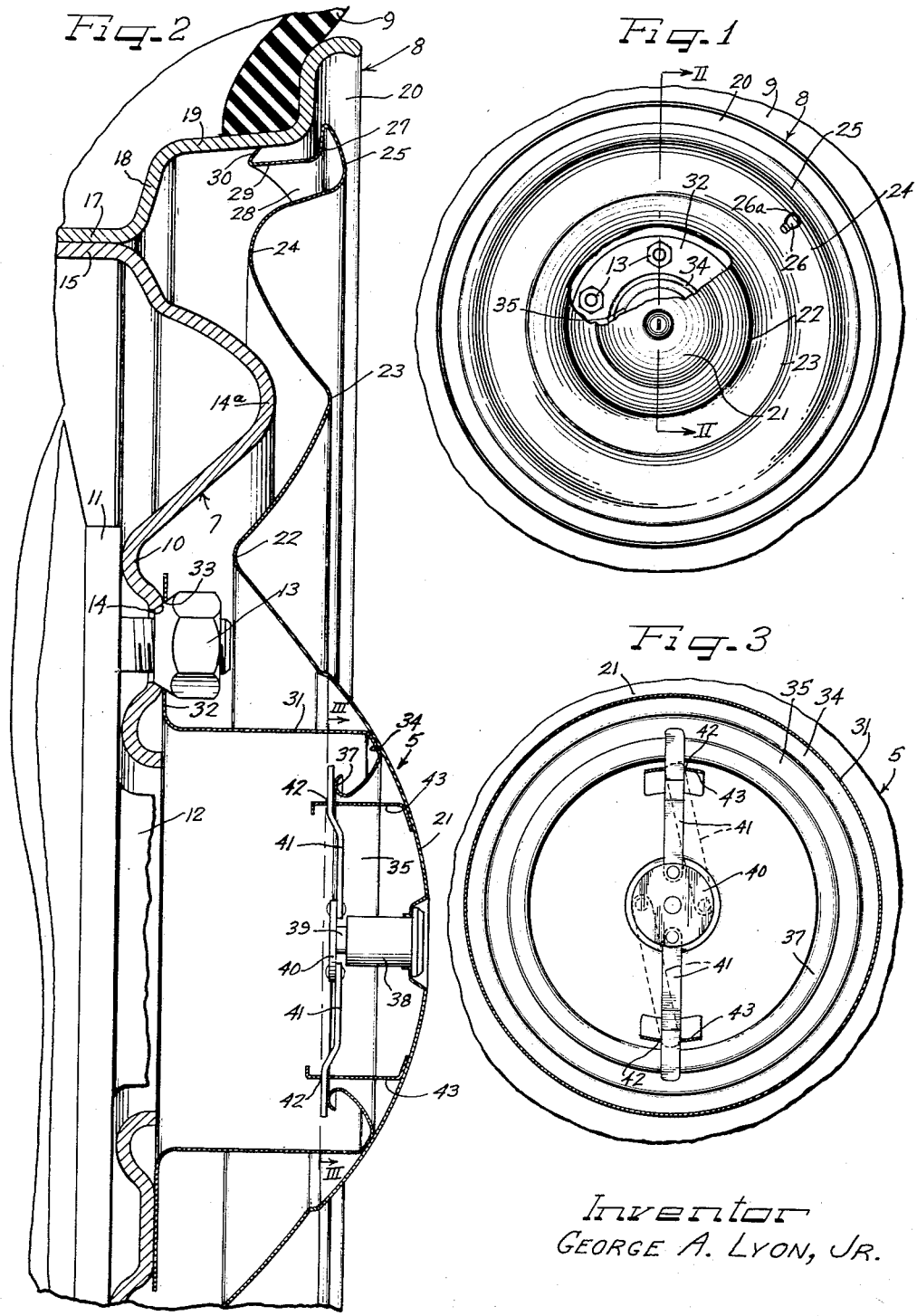
Inventor
GEORGE A. LYON, JR.

United States Patent Office 2,971,798
Patented Feb. 14, 1961

2,971,798

WHEEL COVER

George A. Lyon, Jr., Birmingham, Mich.
(13881 W. Chicago Blvd., Detroit 28, Mich.)

Filed Aug. 31, 1956, Ser. No. 607,495

2 Claims. (Cl. 301—37)

The present invention relates to improvements in wheel structures and more particularly concerns the ornamental and protective covering of the outer sides of vehicle wheels.

Wheel covers are often removed and stolen from automobiles, and particularly the more expensive models of automobiles. It is therefore desirable to provide means which will prevent or at least strongly deter such theft. Some means that have been suggested for this purpose have a tendency to throw the wheel out of balance.

It is desirable to apply wheel covers to vehicle wheels in press-on, pry-off relation, and more especially by providing the covers with marginal retaining structure behind a marginal portion of the cover which overlies the portion of the wheel engaged by the retaining structure. Sometimes when there is direct engagement of the wheel part such as the tire rim by the marginal portion of the cover that overlies the retaining means undesirable frictional noises develop in running of the wheel by reason of the resilient yielding or flexing of the wheel and more especially the tire rim, whereby frictional relative movement between the overlying marginal cover portion and the engaged wheel part ensues.

It is an important object of the present invention to solve both of the problems outlined hereinbefore in a novel, simple manner.

Another object of the invention is to provide in a wheel structure a novel cover assembly including not only means for locking the cover against theft but also for retaining the cover in a predetermined spaced relation to the wheel so as to avoid direct contact of the cover with the wheel except the engagement effected by cover retaining means on the cover with a wheel part.

A further object of the invention is to provide a symmetrically balanced cover locking arrangement for theft proofing a cover.

Still another object of the invention is to provide novel bottoming or stop shoulder means for predetermining the axially inward disposition of a cover to a wheel.

Yet another object of the invention is to provide novel means which will prevent frictional noises or squeaks between a wheel cover and a wheel to which the cover may be applied.

A still further object of the invention is to provide novel structure for engagement with a central or crown portion of a wheel cover to limit axial disposition of the cover to a vehicle wheel and more particularly to radially outer portions of the wheel.

Other objects, features and advantages of the present invention will be readily apparent from the following detailed description of a preferred embodiment thereof taken in conjunction with the accompanying drawing, in which:

Figure 1 is an outer side elevational view of a wheel structure embodying features of the invention, with a portion broken away and in section to show certain details of structure;

Figure 2 is a fragmentary diametrical sectional detail view taken substantially on the line II—II of Figure 1; and Figure 3 is a fragmentary sectional detail view taken substantially on the line III—III of Figure 2.

According to the present invention, a wheel cover 5 is constructed and arranged to be applied to the outer side of a vehicle wheel including a disk spider wheel body 7 supporting a multi-flange drop center tire rim 8 which is constructed and arranged to carry a pneumatic tire 9. The wheel body 7 includes a central dished bolt-on flange 10 which is adapted to be secured to a supporting flange 11 of a vehicle axle structure including a hub 12. Attachment bolts 13 are provided for securing the bolt-on flange 10 to the flange 11 at suitable bolt apertures 14 provided for this purpose.

Disposed concentrically about the radially outer side of the bolt-on flange 10 of the wheel body is an axially outwardly projecting annular nose bulge 14a which slopes to an attachement flange 15 at the outer periphery of the wheel body secured in suitable manner to a base flange 17 of the tire rim. Extending generally radially outwardly from the base flange of the tire rim is an outer side flange 18 which merges with an intermediate generally axially outwardly and radially outwardly sloping flange 19 leading to generally radially outwardly and then axially outwardly turned terminal flange 20.

The wheel cover 5 is preferably in the form of a plate or sheet metal disk of a diameter for substantially covering the outer side of the wheel including the wheel body 7 and the tire rim 8. Suitable sheet material such as stainless steel, brass, aluminum or the like may be utilized in production of the cover plate. Such material lends itself readily to suitable ornamental finishing.

Centrally the wheel cover 5 is provided with a crown portion 21 which may be in the form of a dome as shown bulging axially outwardly and adapted to accommodate therebehind the hub 12 of the axle structure to which the wheel is attached. Radially outwardly about the crown 21 may be provided an indented annular rib 22 adapted to project in the assembly toward the radially outer portion of the bolt-onflange 10 and radially inwardly from the nose bulge 14a. For overlying the nose bulge 14a a generally corresponding axially outwardly bulging annular rib-like portion 23 is provided on the cover which extends generally radially outwardly and axially inwardly to an inwardly dished annular portion 24 which projects the assembly generally axially inwardly into the groove defined between the nose bulge 14a and the tire rim. At the radially outer side of the indented annular portion 24 of the cover is a rib-like annular marginal portion 25 which is preferably turned to extend generally radially outwardly and axially inwardly for overlying disposition to the terminal flange 20 and more particularly the radially inner portion of the terminal flange.

For at least substantially retaining the cover 5 on the wheel, cover retaining means are provided behind the outer marginal portion of the cover for engagement with a portion of the wheel. To this end, behind the outer marginal portion 25 of the cover is provided a return bent generally radially inwardly extending flange 27 provided with a generally axially inwardly extending annular continuous flange portion 28 for generally telescoping the axially outer portion of the intermediate flange 19 of the tire rim in spaced relation. Axially inward retaining finger extensions 29 are provided on the flange portion 28, with short and stiff generally radially and axially outwardly oblique retaining terminals 30 thereon for retaining gripping direct edgewise engagement with the intermediate flange 19. Through this arrangement, application of the cover 5 to the outer side of the wheel is effected by first registering a valve stem 26 through a valve stem aperture 26a in the dished portion 24 of the cover and then pressing the cover axially inwardly to effect uniform retaining engagement of the retaining fingers 29 and more particularly the retaining terminals 30 thereof with the intermediate flange 19. There may be as many as preferred of the fingers 29, eight to sixteen being used depending upon the material of the cover, size of wheel, and the like. Normally the retaining finger terminals 30 extend to a diameter which is slightly larger than the diameter of the portion of the intermediate flange 19 to be engaged by the fingers and as the cover is pressed axially inwardly the fingers 29 are resiliently flexed radially inwardly and thereby effect a strong thrusting retaining tensioned pressure of the retaining terminals 30 against the terminal flange of the tire rim.

With some wheels it has been found that resilient flexing, weaving, yielding movements of the wheel part engaged by the cover cause frictional relative movement of the wheel part and the cover resulting in rubbing vibrational noises or squeaking. To avoid such noises, it has been found desirable to maintain the overlying portion of the cover, in the present instance the outer marginal portion 25 and the underturned flange portion 27 out of contact with the tire rim. For this purpose, I provide stop means carried by the wheel and engagable by the wheel cover to retain the cover positively against engagement with the wheel except at the retaining terminal means of the cover retaining structure. Herein the stop means comprise shoulder structure in the form of a tubular member 31 of an inside diameter at least as large as the diameter of the usual central opening in the bolt-on flange 10 of the wheel body and provided with a lateral generally radially outwardly projecting base flange 32 which is adapted to overlie the bolt-on flange 10 and is provided with bolt apertures 33 arranged to register with the bolt-on flange bolt apertures 14 so that the tubular shoulder member 31 may be attached to the wheel concentrically relative to the bolt-on flange by wheel bolts 13.

At its axially outer end, the tubular shoulder member 31 is provided with a cover-engagable turned shoulder 34 of annular form and located in such spaced relation axially outwardly form the bolt-on flange 10 that when the crown portion 21 of the cover engages against the shoulder 34 the cover is positively held in predetermined spaced relation from the wheel and more particularly the outer marginal portions 25 and 27 of the cover are held spaced from the tire rim, substantially as shown in Figure 2. Since the cover body due to the multi-rib structure thereof is substantially stiff, and the annular stop shoulder 34 uniformly engages inside the crown 21 concentrically relative to the cover, tilting or canted disposition of the cover relative to the wheel is substantially avoided. Through this arrangement only the tips of the retaining finger terminals 30 engage the wheel at the intermediate flange 19. Since the shoulder member 31 is mounted on a portion of the wheel that is free from flexing movements, there is little if any tendency for relative movement between the shoulder member and the crown portion of the cover.

The shoulder member 31 is also taken advantage of for locking the cover 5 against theft. To this end, the shoulder extremity portion 34 of the member 31 is provided with a generally inturned annular flange 35 which in the present instance extends radially and axially inwardly and has an underturned inner bead-like axially inwardly facing shoulder flange terminal 37.

Engageable with the terminal 37 are locking means carried by the cover. Herein such locking means comprise a suitable key operated tumbler type lock unit 38 carried centrally by the cover on the dome portion 21 thereof with an axially inwardly directed rotary shaft 39 carrying a latch or locking bolt rotary element such as a disk 40 at its inner terminus. Pivotally connected to the disk 40 is a pair of diametrically oppositely extending latch or locking bolt arms 41 having their distal end portions extending slidably through suitable apertures 42 in supporting hanger brackets 43 respectively carried by and depending from the dome portion 21 spaced apart on a diameter slightly less than the inside diameter of the opening through the flange 35. The latch or locking bolts 41 are located in axially inwardly spaced relation relative to the portion of the cover dome 21 that engages the stop shoulder 34 to a proper distance to effect snug sliding engagement with the underturned shoulder 37 to hold the cover against the shoulder 34.

Before mounting of the cover and in order to release the cover from the wheel, the bolt elements 41 are retracted as shown in dash outline in Figure 3 whereby the distal extremities of the bolts clear the keeper flange 35. In applying the cover after the crown portion has seated against the stop shoulder 34, the lock mechanism 38 is operated to project the bolts 41 into locking relation behind the keeper shoulder 37. Hence, without use of the proper key for unlocking the cover, the cover cannot be removed. When the proper key has been inserted into the lock mechanism 38 and the lock opened by retracting of the bolts 41, the cover may be removed from the wheel by inserting a pry-off tool behind the under-turned outer marginal flange 27 to pry the cover free from the wheel. It will be noted that in addition to maintaining the cover in spaced relation to the wheel and more particularly at the tire rim, a pry-off gap is provided between the underturned marginal flange 27 and the tire rim.

It will be understood that modifications and variations may be effected without departing from the scope of the novel concepts of the present invention.

I claim as my invention:

1. In a wheel structure including a wheel body having a central bolt-on flange and carrying a tire rim for a pneumatic tire, a cover member for ornamental and protective disposition over the outer side of the wheel including a central crown dome portion for overlying the bolt-on flange and enclosing the central portion of the wheel, a tubular member having means thereon by which it is attached to said bolt-on flange, the tubular member projecting axially outwardly centrally from the bolt-on flange and having on its outer end portion a cover-engageable turned shoulder projecting generally radially inwardly and of annular form against which the axially inner side of the crown dome of the cover member is engageable in firmly seated relation, said shoulder having extending generally radially and axially inwardly an inturned annular flange terminating in an understurned inner bead-like axially inwardly facing shoulder flange terminal, and locking means carried by the crown dome portion of the cover and including a key operated lock unit projecting axially inwardly from the center of the crown dome portion and having on its inner end portion locking bolt arms projecting generally radially outwardly and engageable in cover retaining snug sliding relation with the underturned shoulder terminal to hold the crown dome portion of the cover against said annular shoulder of the tubular member, said key operable lock unit being operable from the axially outer side of the cover for actuating said bolt arms relative to said shoulder flange terminal.

2. In a wheel structure including a wheel body having a central bolt-on flange and carrying a tire rim for a pneumatic tire, a cover member for ornamental and protective disposition over the outer side of the wheel including a central crown dome portion for overlying the bolt-on flange and enclosing the central portion of the wheel, a tubular member having means thereon by which it is attached to said bolt-on flange, the tubular member projecting axially outwardly centrally from the bolt-on flange and having on its outer end portion a cover-engageable turned shoulder projecting generally radially inwardly and of annular form against which the axially inner side of the crown dome of the cover member is engageable in firmly seated relation, said shoulder having extending generally radially and axially inwardly and inturned annular flange terminating in an underturned inner bead-like axially inwardly facing shoulder flange terminal, locking means carried by the crown dome portion of the cover and including a key operated lock unit projecting axially inwardly from the center of the crown dome portion and having on its inner end portion locking bolt arms projecting generally radially outwardly and engageable in cover retaining snug sliding relation with the underturned shoulder terminal to hold the crown dome portion of the cover against said annular shoulder of the tubular member, said key operable lock unit being operable from the axially outer side of the cover for actuating said bolt arms relative to said shoulder flange terminal, and supporting hanger brackets carried by said crown dome portion and projecting in the same direction as said lock unit and located on a diameter slightly less than the inside diameter of the opening provided by said radially and axially inwardly extending flange and with the inner end portions projecting axially inwardly beyond said flange terminal, said bolt arms extending slidably in supported relation through apertures in the hanger brackets.

References Cited in the file of this patent

UNITED STATES PATENTS

| | | |
|---|---|---|
| 2,031,092 | Begg | Feb. 18, 1936 |
| 2,154,118 | Ames | Apr. 11, 1939 |
| 2,650,862 | Lyon | Sept. 1, 1953 |
| 2,665,948 | Lyon | Jan. 12, 1954 |
| 2,690,357 | Lyon | Sept. 28, 1954 |
| 2,729,510 | Lyon | Jan. 3, 1956 |
| 2,756,110 | Lyon | July 24, 1956 |
| 2,869,929 | Hurd | Jan. 20, 1959 |

FOREIGN PATENTS

| | | |
|---|---|---|
| 630,176 | Great Britain | Oct. 6, 1949 |